Jan. 26, 1932.  F. BURGESS  1,842,538
APPARATUS FOR GRINDING GEARS
Filed April 13, 1929    10 Sheets-Sheet 1

Inventor:
Frank Burgess,
by Walter E. Lombard,
Atty.

Jan. 26, 1932.  F. BURGESS  1,842,538
APPARATUS FOR GRINDING GEARS
Filed April 13, 1929  10 Sheets-Sheet 2

Inventor:
Frank Burgess,
by Walter E. Lombard.
Atty.

Inventor:
Frank Burgess,
by Walter E. Lombard,
Atty.

Jan. 26, 1932.   F. BURGESS   1,842,538
APPARATUS FOR GRINDING GEARS
Filed April 13, 1929   10 Sheets-Sheet 10

Inventor:
Frank Burgess,
by Walter E. Lombard,
Atty.

Patented Jan. 26, 1932

1,842,538

UNITED STATES PATENT OFFICE

FRANK BURGESS, OF WOLLASTON, MASSACHUSETTS

APPARATUS FOR GRINDING GEARS

Application filed April 13, 1929. Serial No. 354,944.

This invention relates to apparatus for grinding gears and has for its object the provision of a machine capable of quick adjustment to adapt it for grinding either spur gears or helical gears of various sizes.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings.

Similar characters indicate like parts throughout the several figures of the drawings.

Figure 1:
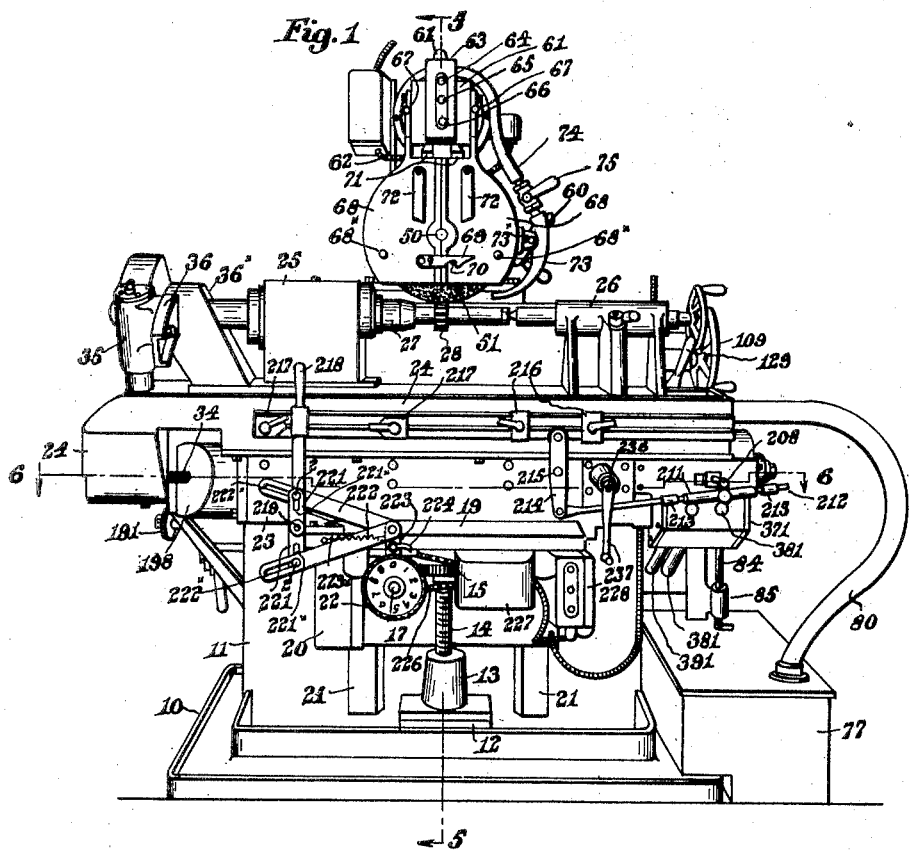
Figure 1 represents a perspective view of a machine embodying the principles of the present invention and showing the grinding wheel in position to grind spur gears.

In the drawings, 10 is a base having extending upwardly therefrom a hollow rectangular column 11, and also a hollow support 12 for a fixed nut 13 having threaded thereto a lifting screw 14.

The upper end of the lifting screw 14 has secured thereto a worm gear 15 adapted to be rotated by means of a worm 16 on a horizontal shaft 17 revoluble in bearings 18 depending from a table 19 extending forwardly from a vertical plate 20 slidable vertically on guides 21 formed upon the front face of the column 11.

The forward end of the shaft 17 has secured thereto a ratchet wheel 22 adapted to be actuated by means of mechanism to be hereinafter described.

When the gear 15 is rotated by means of the worm 16 it will cause the screw 14 to rotate in the nut 13 and raise or lower the table 19 as the case may be.

The front face of the ratchet 22 has index characters thereon by which the vertical adjustment of the table 19 may be accurately determined.

Secured to the upper face of the table 19 is an elongated housing 23 on top of which is slidably mounted a carriage 24 having secured thereto the headstock 25 and the adjustable tailstock 26, both of usual construction.

The headstock 25 has mounted therein the revoluble arbor 27 adapted to support the gear 28 to be ground, this arbor having secured to one end thereof a worm gear 29 adapted to be rotated by a worm 30 secured to a shaft 31 having fixed to its lower end a bevel gear 32 meshing with a bevel gear 33 fixed to a revoluble shaft 34 extending into and lengthwise of the housing 23, and adapted to be rotated by mechanism to be hereinafter described.

The casing 35 in which the worm 30 and shaft 31 are mounted is adapted to be moved about the axis of the shaft 34 free from engagement with the worm gear 29 to permit the removal of said gear 29 when it is desired to use a larger or smaller worm gear 29.

When the gear 29 is in mesh with the worm 30, the casing 35 is secured to the arm 36 extending forwardly from a support 36x extending upwardly from the carriage 24.

The end of the shaft 34 within the housing 23 is revoluble in bearing 34x fixed to the wall of said housing while the outer end thereof revolves in a bearing 24x at one end of the slidable carriage 24, said shaft being movable with said platform.

Within the housing 23 and extending lengthwise thereof is a feed screw 37 threaded to a nut 37x secured to the platform 24 and extending downwardly into said housing 23 through an elongated opening in the upper wall thereof.

This screw 37 has secured to one end thereof the worm gears 38, 39, adapted to be driven respectively by means of worms 38x and 39x mounted upon the upper ends of the inclined shafts 381 and 391, the opposite ends of which extend into a pivoted housing 40, this housing containing a bevel gear 401 on the shaft 381 meshing with another bevel gear 402 on a rotatable shaft 40x extending into the gear box 41 containing speed gearing which will be hereinafter described.

Figure 6:
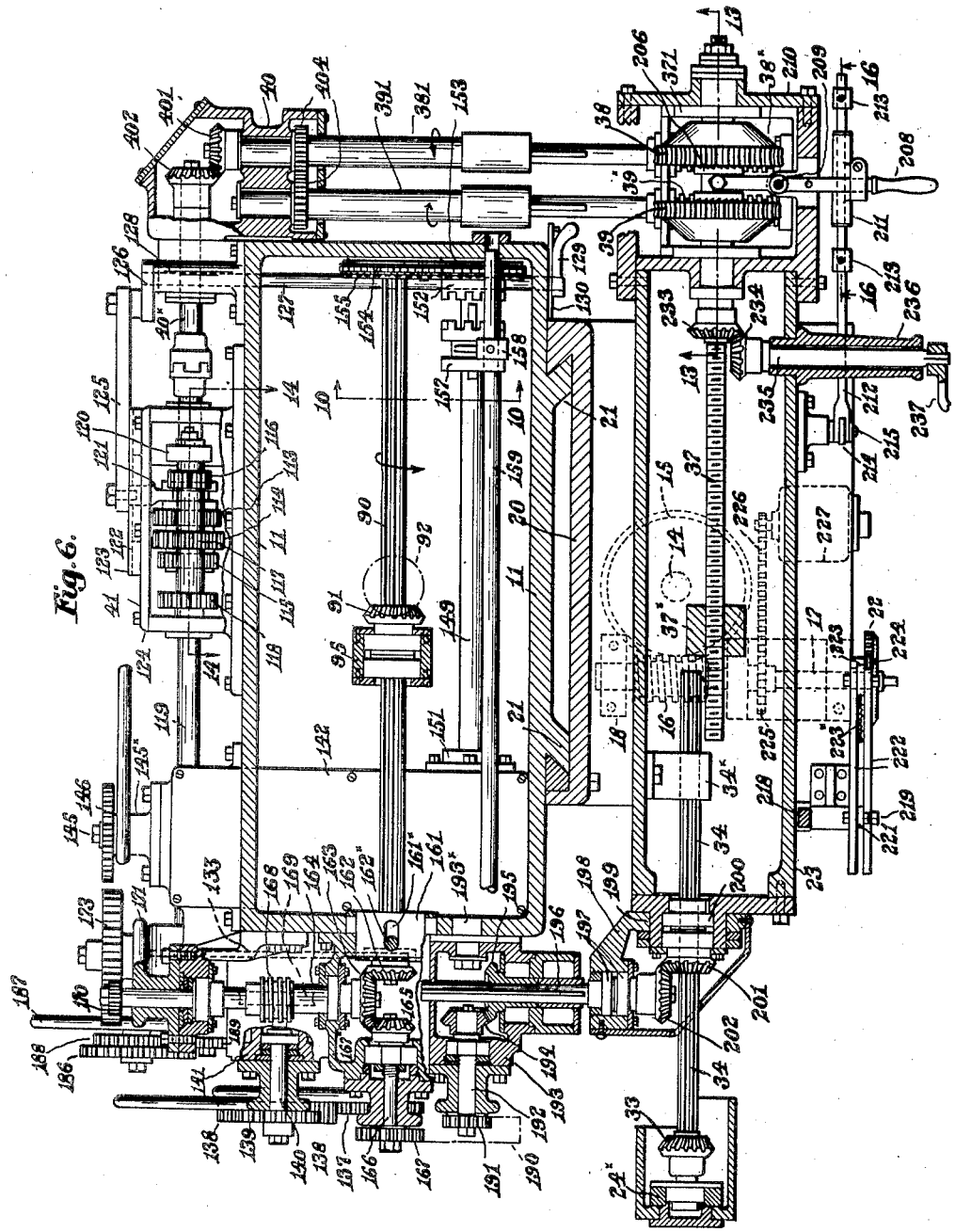
Figure 6 represents a horizontal section of the machine on line 6, 6, on Figs. 1, 5, 7 and 11.

The shafts 381 and 391 have intermeshing gears 404 thereon causing said shafts to rotate in opposite directions, as shown in Fig. 6.

Both shafts 381, 391 are made in two parts, one part telescoping into the other and being splined thereto.

By this means these shafts 381, 391, may be lengthened and shortened during the raising and lowering of the table 19 without disengaging the worm 38x from the worm gear 38.

Figure 8:
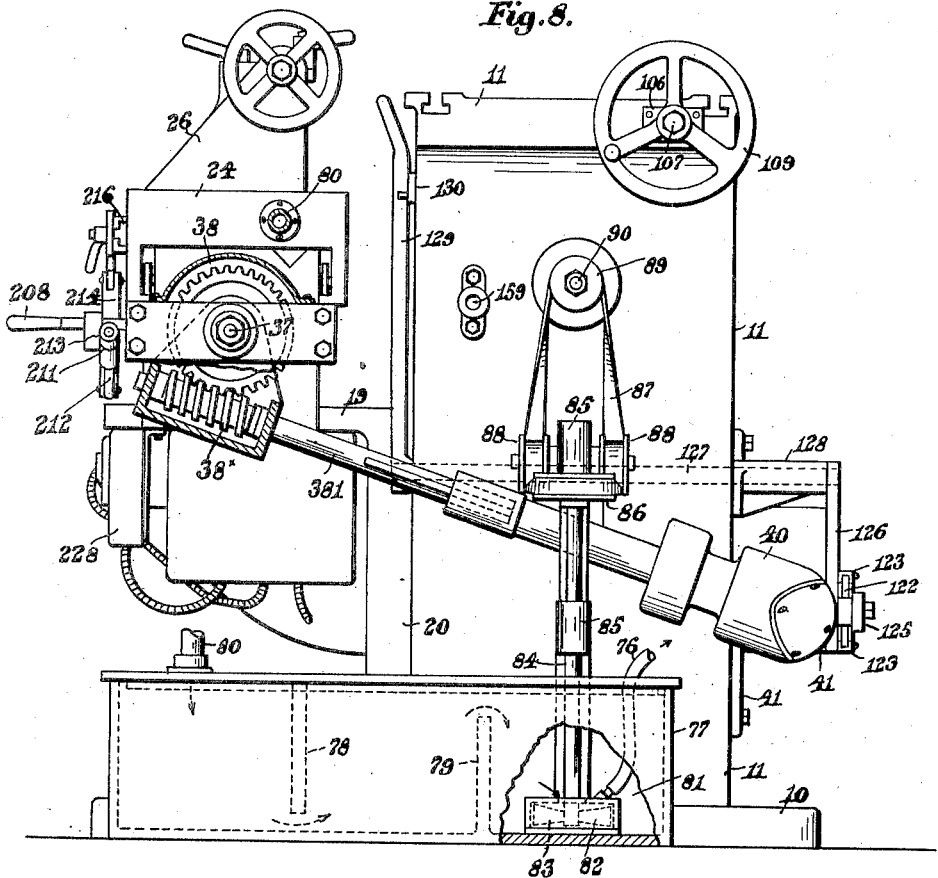
Figure 8 represents an elevation of right side of the base of the machine with portions thereof in section.

The housing 40 is adapted to be moved about the axis of the shaft 40x when the worms 38x and 39x and the worm gears 38 and 39 are raised and lowered with table 19, the upper ends of the shafts 381, 391 being supported by the cradle 371 swingingly suspended from shaft 37 as shown in Fig. 8.

The upper end of the column 11 has slidably mounted thereon transversely of the machine a platform 42 having superimposed upon the upper face thereof the cylindrical base of a turntable 43 adapted to be moved about the center thereof, this base portion being surmounted by a split barrel member 44 in which a large tubular member 45 is adapted to be moved endwise.

Supported above this barrel member 44 and slidable endwise thereof is a support 45x having secured thereto a motor 46 which may be of any well known construction and rotates at a constant speed.

The support 45x is connected to the end of the tubular member 45 so that these members may be moved endwise together.

The motor shaft has a drum 47 on the end thereof connected by a plurality of belts 48 to a similar drum 49 keyed to a shaft 50 extending through the tubular member 45.

Figure 2:
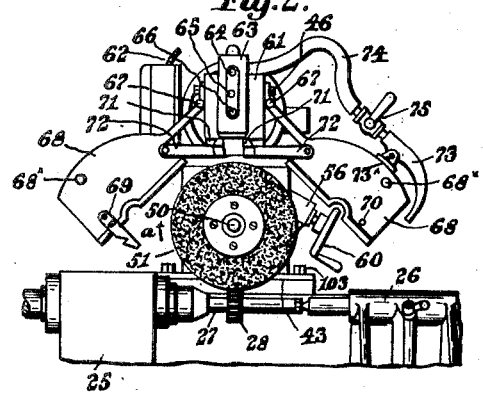
Figure 2 represents a front elevation of the upper portion of the machine with grinding wheel covers in open position.

By means of these belts 48 the shaft 50 may be rotated in either direction, the grinding operation being performed when rotating in the direction of arrow a on Fig. 2, or in the opposite direction.

The opposite or forward end of this shaft 50 has secured thereto a grinding disk 51 of emery or similar abrasive material having an helical tooth formed on the periphery thereof of such a shape as to accurately true the teeth of a gear 28 mounted upon the arbor 27.

Figure 7:
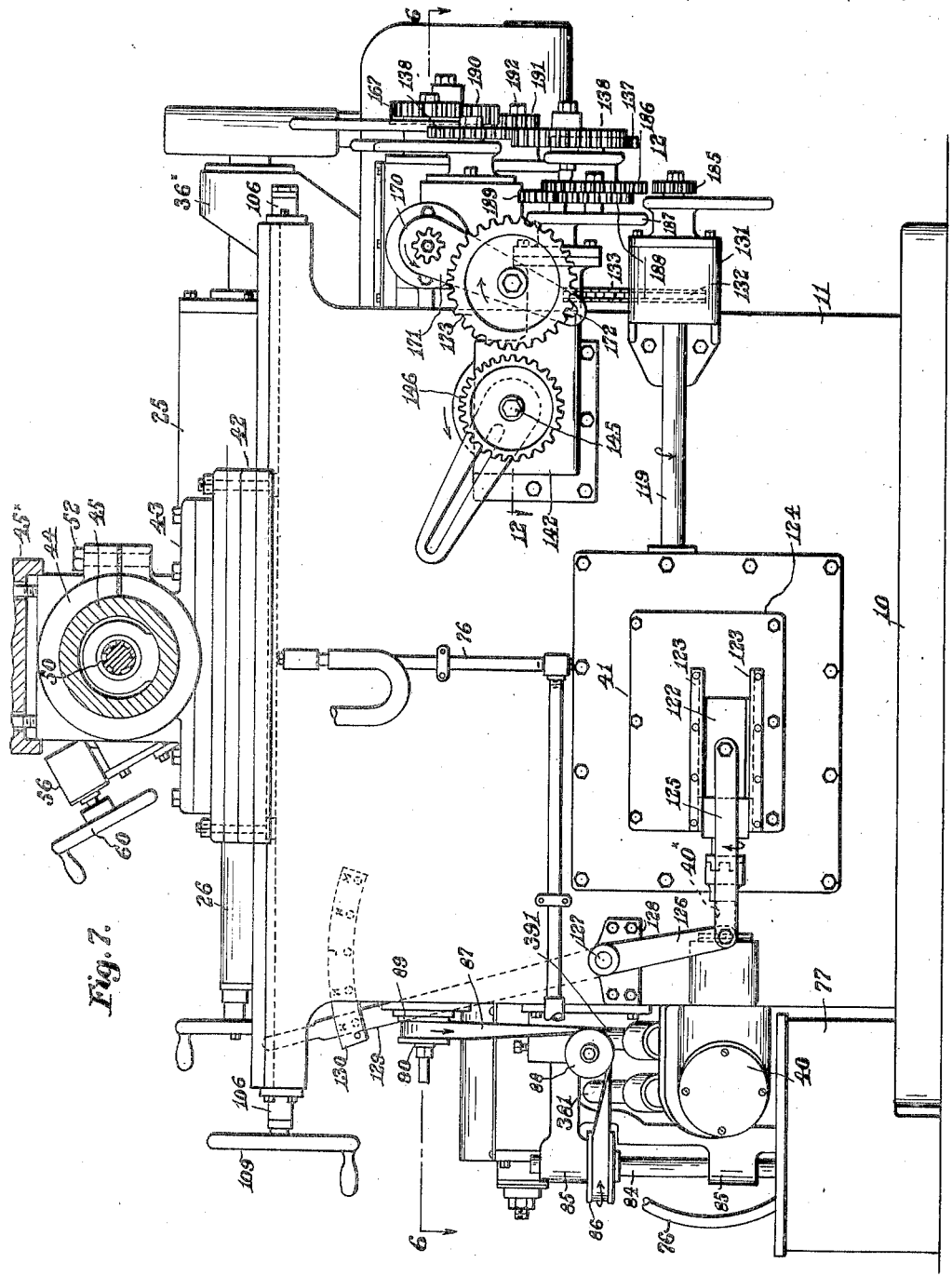
Figure 7 represents a rear elevation of the machine with portions thereof in section.
Figure 11:
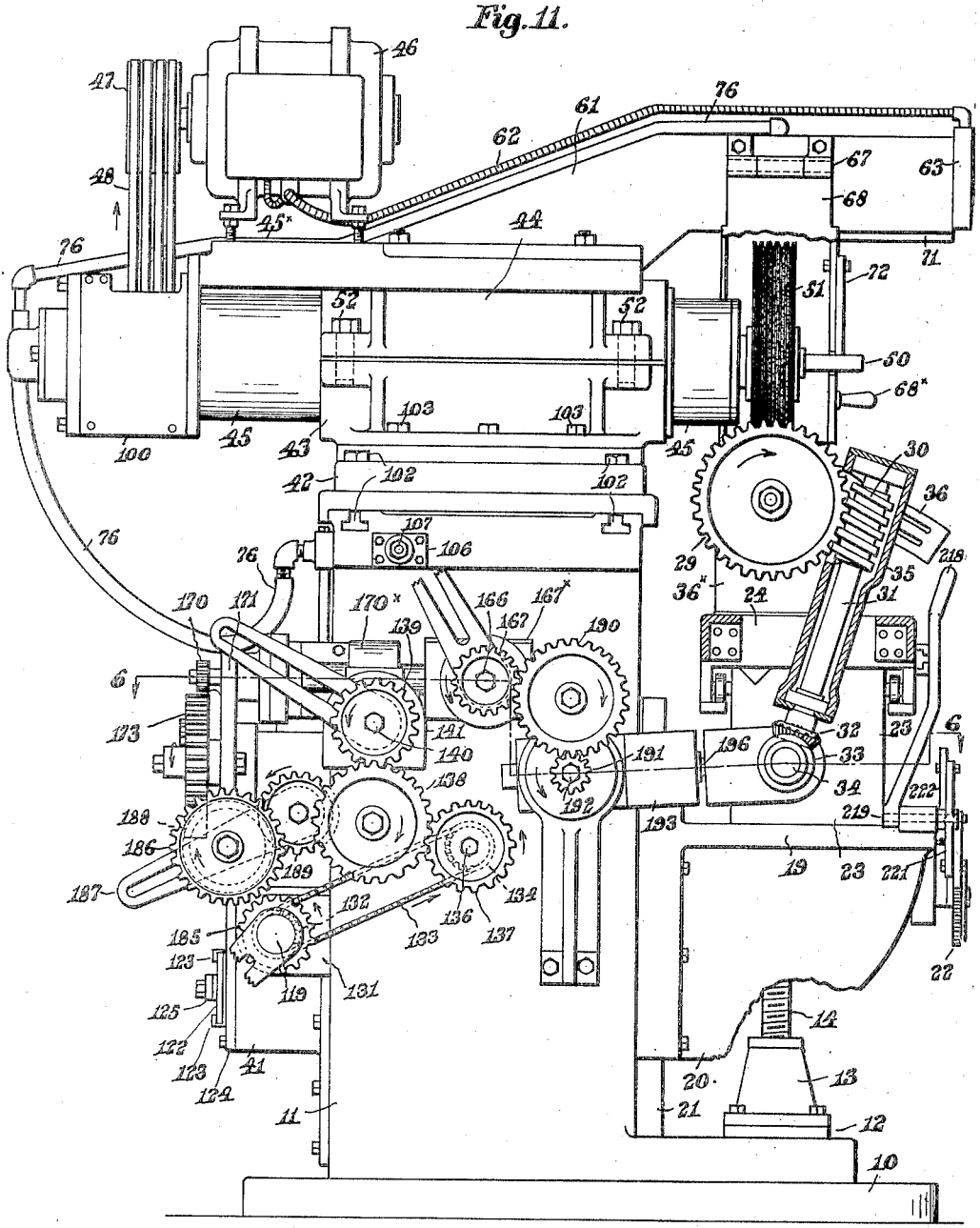
Figure 11 represents an elevation of the left side of the machine with parts thereof shown in section.

When the tubular member 45 has been adjusted to proper position it may be locked by adjusting the clamp nuts 52 on bolts extending through ears formed on the barrel 44, all as shown in Figs. 7 and 11, this adjustment causing the tubular member 45 to be gripped by the barrel 44 so that further end movement is prevented.

Extending lengthwise of the tubular member 45 and in a groove therein is fixed a rack 53 with which meshes a gear 54 on the lower end of a revoluble shaft 55 mounted in a bearing 56 secured to the barrel member 44.

Figures 9, 10:
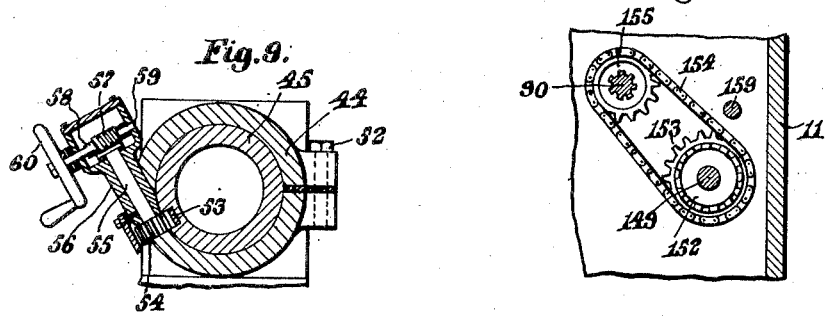
Figure 9 represents a detail in section on line 9, 9, on Fig. 4.
Figure 10 represents a detail in section on line 10, 10, on Fig. 6.

To the upper end of this shaft 55 is secured a worm gear 57 with which meshes a worm 58 rotatable with a shaft 59 to one end of which is secured an actuating wheel 60, all as shown in Fig. 9.

It is obvious that by turning the wheel 60 the tubular member 45 may be adjusted endwise into any desired position.

The support 45x has a hollow forward extension 61 along which extends a cable 62 from the motor 46 to a switch box 63 mounted on the forward end of said extension.

This switch box has three push buttons 64, 65 and 66, thereon two of which are connected to the motor in such manner as when operated to respectively rotate the motor shaft forwardly or in reverse direction.

The third push button, when actuated is designed to stop further rotation of the motor.

As the particular means of connecting this switch box with the motor forms no part of the present invention, it is deemed unnecessary to illustrate the same in detail.

Hinged at 67 to the opposite sides of the extension 61 are covers 68 which are adapted to substantially surround the grinding disk 51 leaving exposed the lower end thereof coacting with the gear 28 to be ground.

When the machine is in operation the covers are locked together as indicated in Fig. 1 by means of a latch 69 pivoted to one cover and coacting with a pin 70 projecting from the other cover.

This latch 69 has limited movement about its pivot so that when the covers 68 are moved from the open position shown in Fig. 2, the pin 70 will automatically engage the notch in said latch 69 and lock the covers 68 in the closed position shown in Fig. 1.

The covers 68 are moved about their pivots 67 by the forwardly projecting handles 68x thereon.

Extending downwardly from the forward end of the extension 61 are two notched projections 71 with which the pivoted bars 72 are adapted to engage and to retain the covers 68 in open position as indicated in Fig. 2 of the drawings, thus giving access to the grinding disk 51 and permitting its removal when desired.

Pivotally secured to one of the covers 68 is a nozzle 73 communicating with a flexible pipe 74 and provided with a controlling valve 75.

The discharge end of this nozzle is directed toward the lower end of the grinding member 51 and is adapted during the grinding operation to discharge a liquid solution upon said grinding disk 51 and the gear being ground.

When the covers 68 are locked in closed position they will prevent the solution from being thrown in every direction, the only exit therefor being at the bottom of said covers.

The nozzle 73 is pivotally mounted on a support 73x slidably mounted on a cover 68 so that by adjustment the discharge of the solution therefrom may be directed at any desired angle.

This flexible member 74 communicates with a pipe 76 extending rearwardly of the extension 61 and then downwardly into a tank 77 at one side of the base 10 of the machine.

This tank 77 (see Fig. 8) is provided with a downwardly extending baffle plate 78 therein and also an upwardly extending baffle plate 79, the liquid solution being supplied to the tank through the inlet pipe 80 and passing under the baffle plate 78 and over the baffle plate 79, thus causing the compartment 81 in said tank to be filled at all times to a level of the upper edge of the baffle plate 79.

In this compartment 81 is a casing 82 in which is disposed a bladed member 83 and the lower end of the pipe 76 communicates with this casing 82.

The liquid solution is admitted to the casing 82 through a central opening in the top thereof.

The blade member 83 is secured to a vertical shaft 84 revoluble in bearings 85 (see Figs. 7 and 8).

This shaft 84 has a pulley 86 secured thereto which is driven by an endless belt 87 passing under revoluble idler pulleys 88 and over a driving pulley 89 secured to the outer end of a shaft 90 extending through the interior and end walls of the column 11 and having a bevel gear 91 secured thereto.

Figure 5:
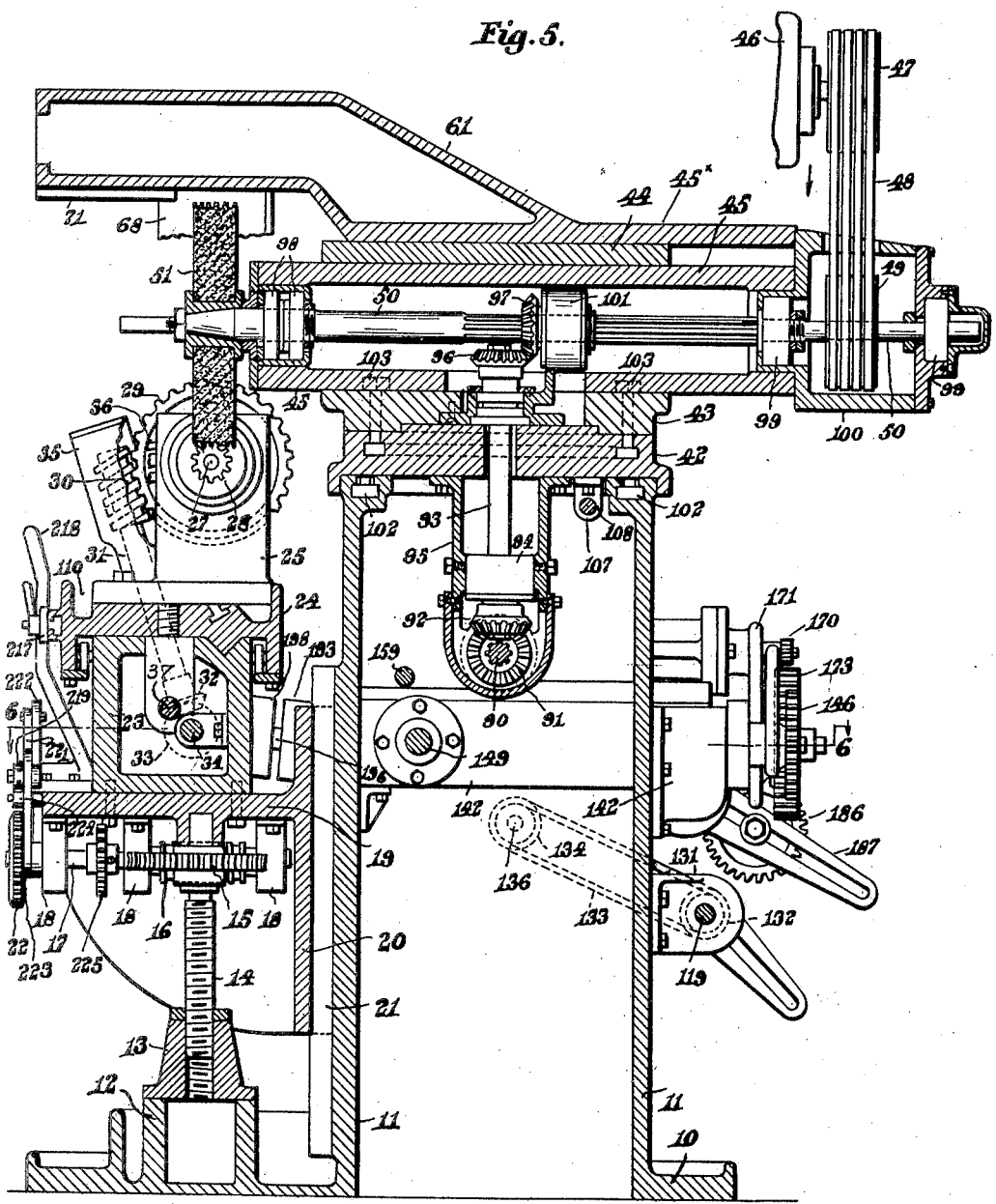
Figure 5 represents a vertical section of said machine on line 5, 5, on Fig. 1 and drawn to an enlarged scale.

This gear 91 meshes with a bevel gear 92 secured to the lower end of the shaft 93 revoluble in a bearing 94 within a casing 95 depending from and movable with the platform 42, all as shown in Fig. 5.

The upper end of the shaft 93 extends through the base of turntable 43 into the interior of the tubular member 45 and has secured to its upper end a bevel gear 96 meshing with a bevel gear 97 splined to the shaft 50 and restrained from end movement when the shaft 50 is moved endwise during the end movement of tubular member 45.

This shaft 50 has bearings 98 at one end thereof within the forward end of the tubular member 45 and has bearings 99 therefor in a casing 100 secured to the rear end of the tubular member 45.

The splined shaft 50 also extends through a bearing 101 secured to the platform 42, said bearing supporting the bevel gear 97 and preventing end movement of said gear when the tubular member 45 and shaft 50 are moved endwise in the barrel member 44.

Figure 4:
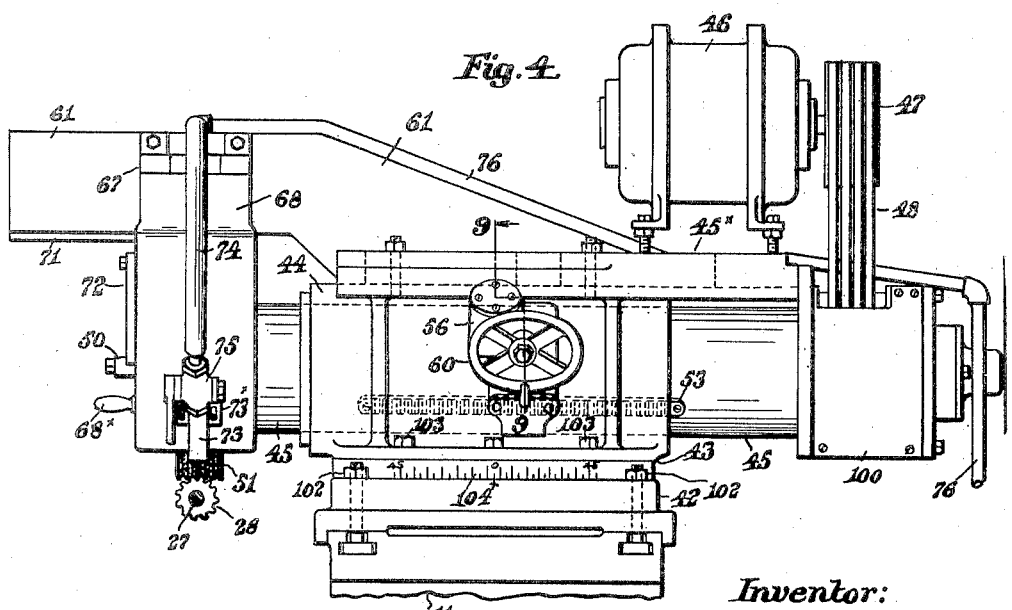
Figure 4 represents a side elevation of the upper part of the machine showing the support for the grinding wheel and the mechanism for rotating the same.

When the platform 42 is moved laterally of the column 11, it may be locked in its adjusted position by means of the clamping members 102, as shown in Fig. 4.

When the base of turntable 43 with the barrel member 44 thereon has been moved about its vertical axis, it may be locked in its adjusted position by means of the clamping member 103, shown in dotted lines in Fig. 5.

The periphery of the base of turntable 43 is provided with a graduated scale 104 which may be used to quickly determine the angular position of said turntable 43 when moved about its vertical axis.

The opposite ends of the column 11 has bearings 106 secured thereto in which is revoluble a feed screw 107 threaded to a nut 108 secured to the under face of the slidable platform 42.

The outer ends of the shaft 107 has secured thereto an actuating wheel 109.

By rotating this wheel 109 the feed screw 107 coacting within the nut 108 will move the platform 42 lengthwise of the column 11.

The upper part of the carriage 24 is chambered out to form a trough 110 to receive the liquid solution used on the grinding member and the gear being ground.

The pipe 80 of the tank 77 leads to and communicates with this trough 110 and the liquid solution collecting in this trough passes down the pipe 80 into the tank 77 to be used over and over again.

The baffle plate 79 in the tank prevents any sediment from passing into the compartment 81 and the pump casing 82 therein.

The shaft 40x extends lengthwise of the speed box 41 and is revoluble in bearings 111 in the opposite ends of said box.

The shaft 40x has keyed thereto a slidable member 112 on the hub of which are keyed three gears, 113, 114 and 115.

These gears 113, 114 and 115 are adapted to mesh respectively with the gears 116, 117 and 118, keyed to and revoluble with a parallel shaft 119 revoluble in bearings 120 in the opposite ends of the gear box 41.

Figure 14:
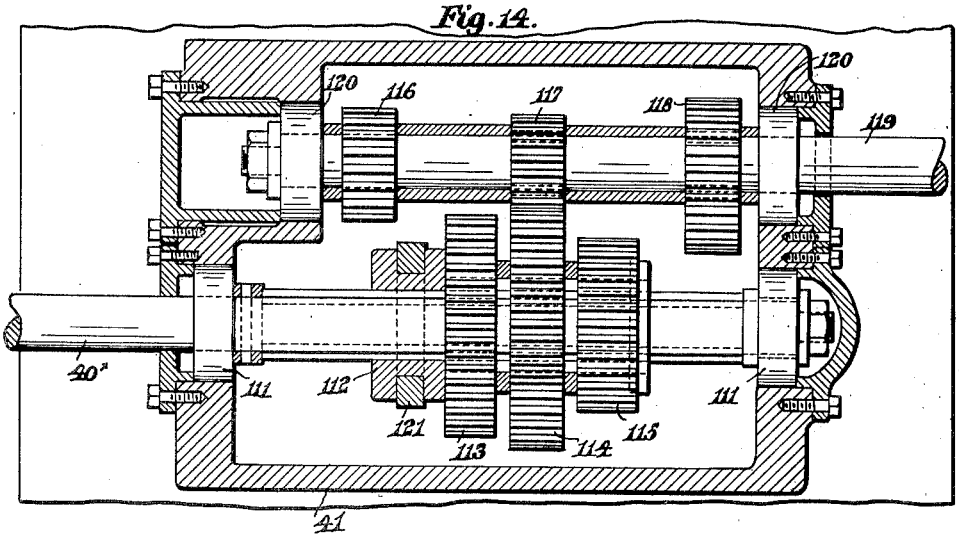
Figure 14 represents a vertical section on line 14, 14 on Fig. 6.

When the gears 113 and 116 are in mesh, the rotary movement of the shaft 119 will impart a medium speed to the shaft 40x; when the gears 114 and 117 are in mesh as shown in Fig. 14, the shaft 117 will drive the shaft 40x at a low speed; and when the gears 115 and 118 are in mesh, the shaft 119 will drive the shaft 40x at a high speed.

The slidable member 112 has a groove therein into which extends a forked member 121 secured to a plate 122 slidable between guides 123 on the cover 124 of the gear box.

This plate 122 is pivotally connected to one end of a link 125, the opposite end of which is pivotally connected to a lever 126 secured to a shaft 127, having a bearing 128 on the rear face of the column 11 and a similar bearing on the front face of said column.

The forward end of the shaft 127 has an actuating lever 129 secured thereto which coacts with a segment 130 having characters thereon indicating the high, low, medium and neutral positions of the speed gears in the gear box 41.

It is obvious, therefore, that the operator at the front of the machine by moving the lever 129 may change the speeds at will.

The shaft 119 extends through a casing formed on a bracket 131 secured to the rear of the column 11, this casing having a sprocket wheel 132 thereon from which a sprocket chain 133 extends to a sprocket wheel 134 mounted upon shaft 136 revoluble in a bearing 136x secured to an end face of the column 11, said shaft 136 having revoluble therewith a gear 137.

The gear 137 meshes with a change gear 138 which in turn meshes with a gear 139 on shaft 140 extending from the worm box 141 secured to an end wall of column 11, said shaft being rotated by means to be hereinafter described.

Within the column 11 and extending beyond the rear wall thereof is a box 142 containing differential gearing.

Extending lengthwise of this box is a shaft 143 the forward end of which is mounted in a bearing 144 while the rear end of a shaft 145 alined therewith extends through a bearing 145x and has a gear 146 secured thereto.

The forward end of the shaft 143 extends through a bearing 144x and between the bearings 144, 144x said shaft has keyed thereto a bevel gear 147 meshing with a bevel gear 148 secured to the shaft 149 extending through bearings 150 restrained from end movement in the pocket 151 secured to the wall of the box 142.

Figure 15:
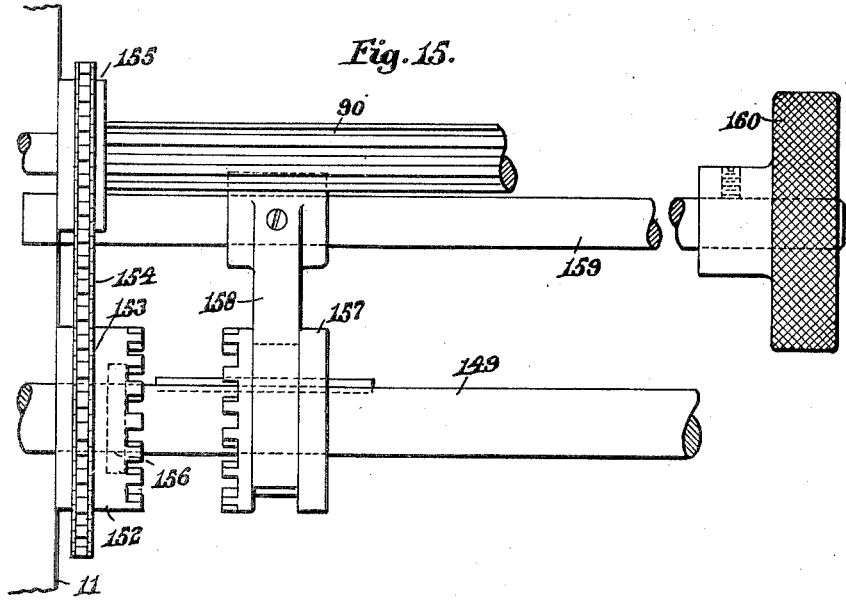
Figure 15 represents an enlarged detail of the clutch mechanism on the differential gear shaft.

The shaft 149 has loosely mounted thereon a clutch member 152 having a sprocket wheel 153 adapted to transmit rotary movement through chain 154 from sprocket wheel 155 on shaft 90, (Figs. 6 and 15.)

This member 152 is restrained from movement endwise of the shaft 149 by a collar 156.

Keyed to the shaft 149 and slidable lengthwise thereof is a grooved clutch member 157, the groove of which is engaged by a bifurcated arm 158 secured to the shifting rod 159.

This rod 159 extends through a wall of the column 11 and has secured to its outer end a milled head 160 by which said rod 159 may be moved in either direction to cause the engagement and disengagement of the clutch members 152, 157.

One end of the shaft 90 extends through a box 161 and has a bevel gear 162 keyed thereto and slidable thereon, this gear 162 being movable into and out of mesh with the gear 163 on shaft 164, by means of element 162x movable endwise of a slot 161x in the box 161 (see Fig. 6).

The gear 163 also meshes with the bevel gear 165 on the shaft 166 which has keyed to its outer end a gear 167, the shaft 166 being revoluble in bearings in the housing 167x secured to an end wall of the column 11.

The shaft 164 has a worm 168 thereon meshing with a worm gear 169 on the inner end of the shaft 140.

The rear end of the shaft 164 has a pinion 170 secured thereto and adjustable about the axis of shaft 164 is an arm 171 having a slot 172 therein in which is adjustably mounted a support for the intermediate gear 173.

This gear 173 is shown in Fig. 7 out of mesh with gear 146 and pinion 170 but may be moved when desired to mesh with both of these elements thereby permitting the rotary movement of shaft 164 to be transmitted to the shaft 145 of the differential gearing.

Within the box 142 and surrounding the shaft 145 is a sleeve 175 having worm gear 176 secured to one end thereof and provided with a bevel gear 177 at its opposite end.

Secured to the rear end of shaft 143 is a bevel gear 178.

The forward end of shaft 145 has a hub 179 provided with a transversely disposed cylindrical support 180 for two revoluble bevel gears 181 meshing with both bevel gears 177 and 178.

Figure 12:
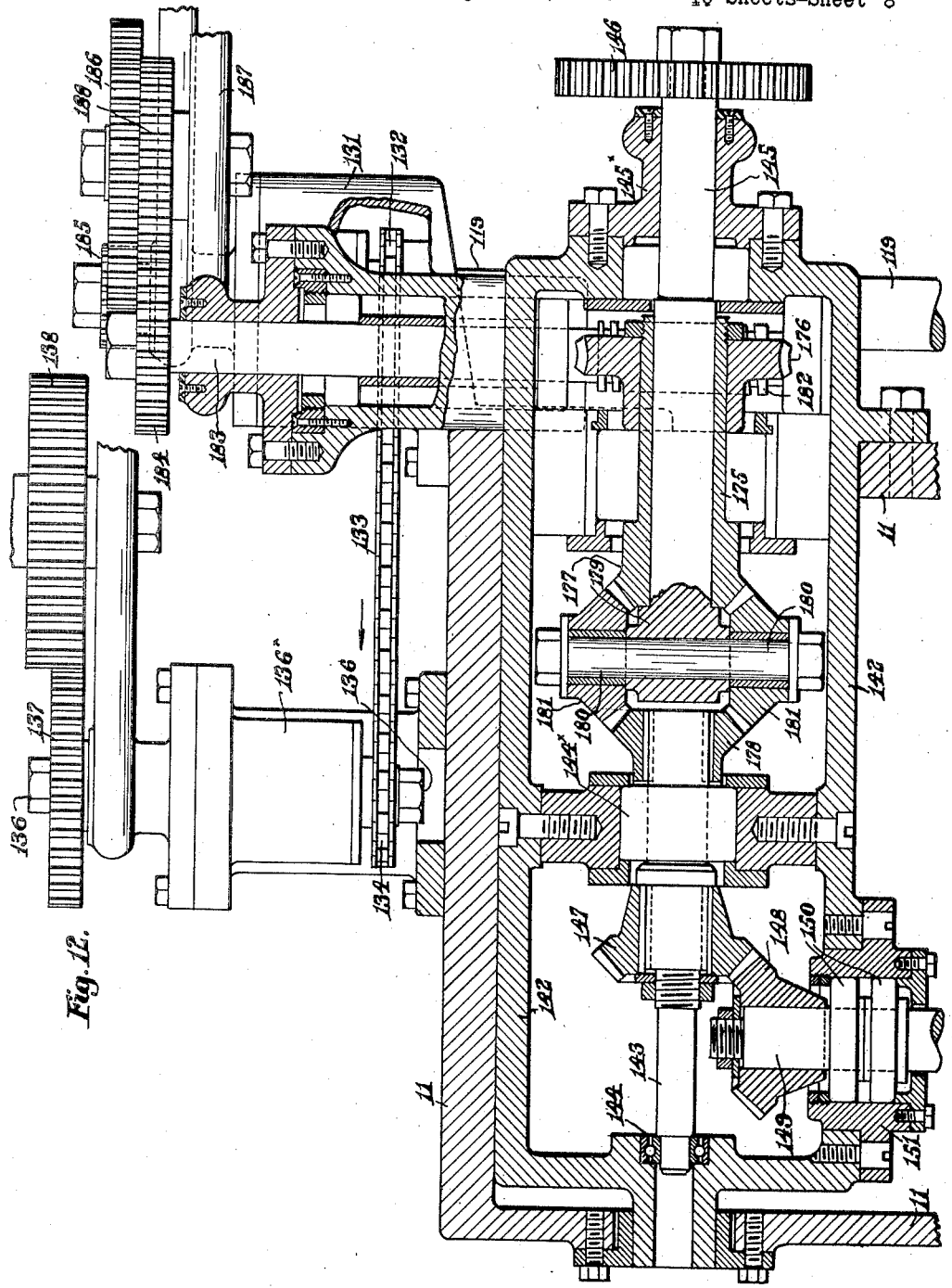
Figure 12 represents a horizontal section on line 12, 12 on Fig. 7.
Figure 13:
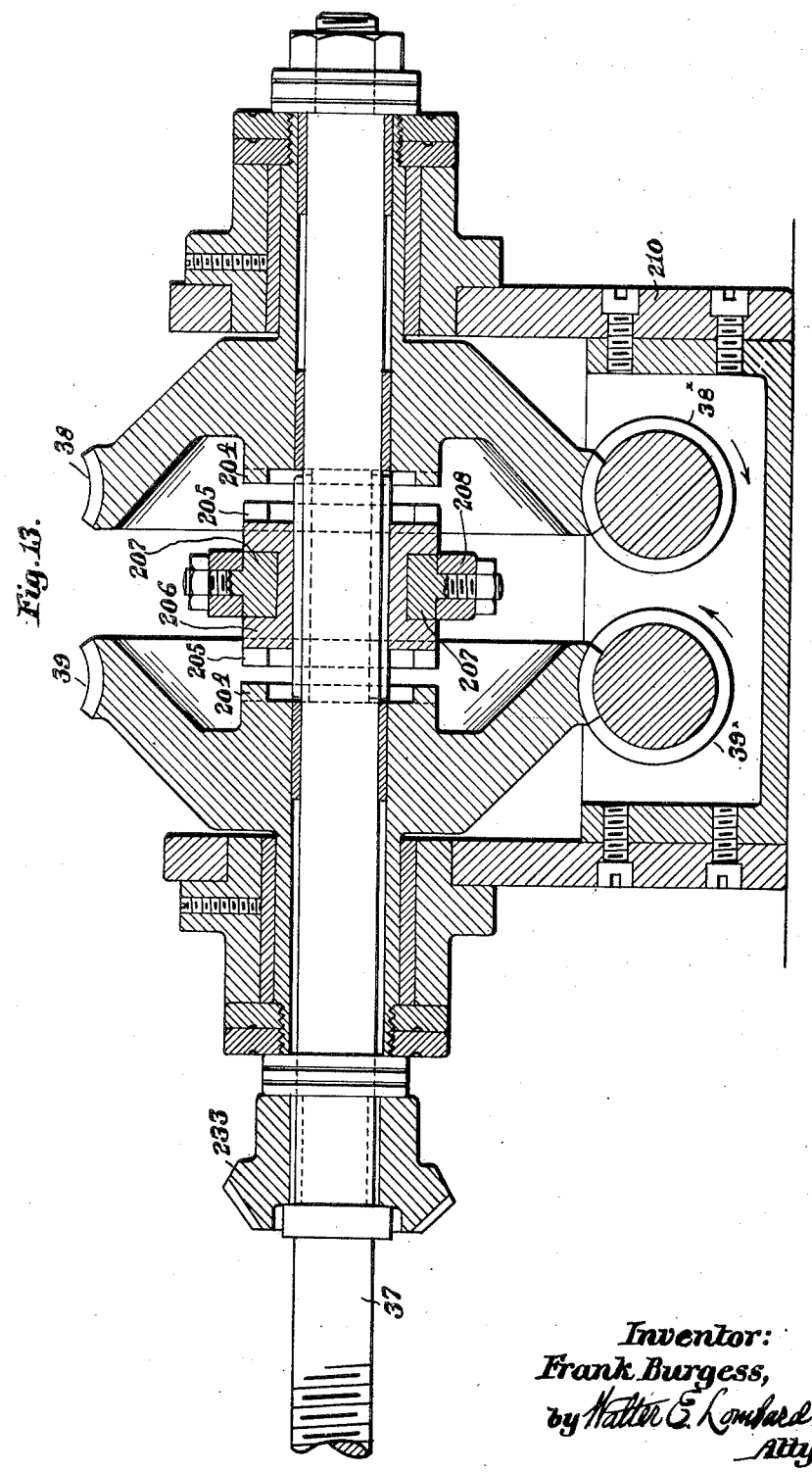
Figure 13 represents a vertical section on line 13, 13, on Fig. 6.

The worm gear 176 meshes with a worm 182 secured to the shaft 183 and having a gear 184 secured to its outer end, all as shown in Fig. 12.

The shaft 119 has secured thereto a pinion 185 adapted at times to mesh with gear 186 adjustable on arm 187, said gear 186 having revoluble therewith a smaller gear 188 meshing with the gear 189.

The gear 167 meshes with the gear 190 which in turn meshes with the pinion 191 secured to a shaft 192 revoluble in a housing 193 and having on its opposite end a bevel gear 194 in mesh with a bevel gear 195 having keyed thereto a shaft 196 which is slidable in the hub of said gear 195.

The forward end of the shaft 196 extends through bearings 197 in a housing 198 movable about a hub 199 formed upon the end of the housing 23 and enclosing bearings 200 for the shaft 34.

This shaft has mounted thereon a revoluble bevel gear 201 which is restrained from end movement when the shaft 34 is moved endwise.

The bevel gear 201 meshes with the bevel gear 202 secured to and revoluble with the shaft 196.

When the table 19 is raised or lowered the housing 193 may be moved about the axis of shaft 192, said housing 193 being pivotally mounted upon the stud 193x fixedly secured to the column 11 in alinement with said shaft 192.

When said housing 193 moves about its axis during the raising and lowering of table 19 and housing 23, the splined shaft 196 will move endwise in the hub of gear 195 so that gears 201, 202, will remain in mesh at all times.

The worm gears 38, 39 are loosely mounted on the shaft 37 and restrained from end movement thereon.

Each worm gear has clutch teeth 204 formed on the hubs thereof with which the teeth 205 on a sleeve 206 are adapted to coact.

The sleeve 206 is keyed to and slidable lengthwise of the shaft 37 and is provided with a peripheral groove into which extend blocks 207 mounted in the bifurcated end of a shifting lever 208 pivoted at 209 to the housing 210 secured to one end of the housing 23.

When the sleeve 206 is moved to right of Fig. 6 it will engage the worm gear 38 and cause the rotary movement thereof to be transmitted to the shaft 37 in one direction while rotary movement of said shaft 37 in the opposite direction will be attained by placing the sleeve 206 in engagement with the worm gear 39.

This rotation of the shaft or feed screw 37, will, through the nut 37x, cause the work carriage 24 to be reciprocated, causing the gear 28 being ground to be moved beneath and in contact with the grinding disk 51.

The lever 208 has connected to the under side thereof a sleeve 211 through which extends a rod 212 having collars 213 secured thereto beyond the opposite ends of said sleeve.

The rod 212 is pivotally connected to the lower end of a lever 214 pivoted to housing 23 at 215 and having its upper end disposed between two blocks 216 adjustably mounted on the front face of the work carriage 24.

During the reciprocation of the work carriage 24 the blocks 216 will alternately contact with the upper end of lever 214 and move the collars 213 into contact with the sleeve 211 and through the lever 208 actuate the clutch 206 first in one direction and then in the opposite direction, thus automatically changing the direction of said work carriage 24.

The work carriage 24 has also adjustably mounted upon its front face two blocks 217 which in the reciprocation of said platform contact with the lever 218 pivoted at 219, the end of said lever being interposed between said blocks 217 and when moved thereby causes a rocking movement of the shaft 219 to which said lever 218 is keyed.

The forward end of shaft 219 has secured thereto the slotted arms 221 each connected to a link 222, the opposite ends of said links being connected to an arm 223 movable about the shaft 17 and carrying a pawl 224 adapted to engage the ratchet wheel 22 on said shaft 17 and impart a step by step rotation thereto regardless of the direction of movement of the carriage 24.

After each forward movement of pawl 224 the arm 223 is returned to its normal position by a spring 223x shown only in Fig. 6.

This forward movement of ratchet 22 is imparted to the worm 16 engaging the worm gear 15 on lifting screw 14, thus rotating the screw and raising the table 19 to adjust the work to the grinding disk 51.

By adjusting the blocks 217 the table 19 may be raised any desired degree which is indicated on the dial on ratchet 22.

The links 222 may also be manually operated by the lever 218 when setting the blocks for any given adjustment.

The shaft 17 has a sprocket wheel 225 thereon connected by a sprocket chain 226 with the shaft of a motor 227.

The motor 227 is electrically connected to a switch box 228 having three push buttons which may be pressed singly to cause the motor to rotate the screw 14 in either direction or stop its rotation.

When the motor 227 is used to lower or raise the carriage 24, the pawl is retained in position indicated in Fig. 1, that is, disengaged from ratchet 22. It is moved into engagement with said ratchet during the grinding operation.

When the grinding of the work is finished the table 19 may be lowered quickly by the motor 227 by pressing upon the reverse button of the switch box 228.

This switching mechanism is not shown nor described in detail as it forms no part of the present invention.

Figure 16:
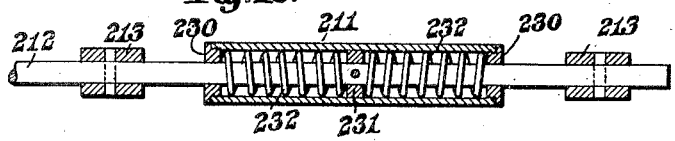
Figure 16 represents a section on line 16, 16, on Fig. 6 drawn to an enlarged scale.

The sleeve 211 is closed at both ends by annular members 230 and midway of its length is a collar 231 pinned to the rod 212, a spring 232 being interposed between each annular member and collar, all as shown in Fig. 16.

When the lever 215 is moved about its pivot by the movement of a block 216 in one direction the collar 231 on rod 212 will compress one of the springs 232 in sleeve 211 and this spring 232 remaining under compression until the carriage 24 moves in the opposite direction will effect a quick shift of the lever 214 about its pivot.

When the blocks 216, 217 have been set to obtain the required reciprocation of the work carriage 24 and the raising of the table 19, the machine will operate automatically to grind and true either spur gears or angle gears.

Figure 3:
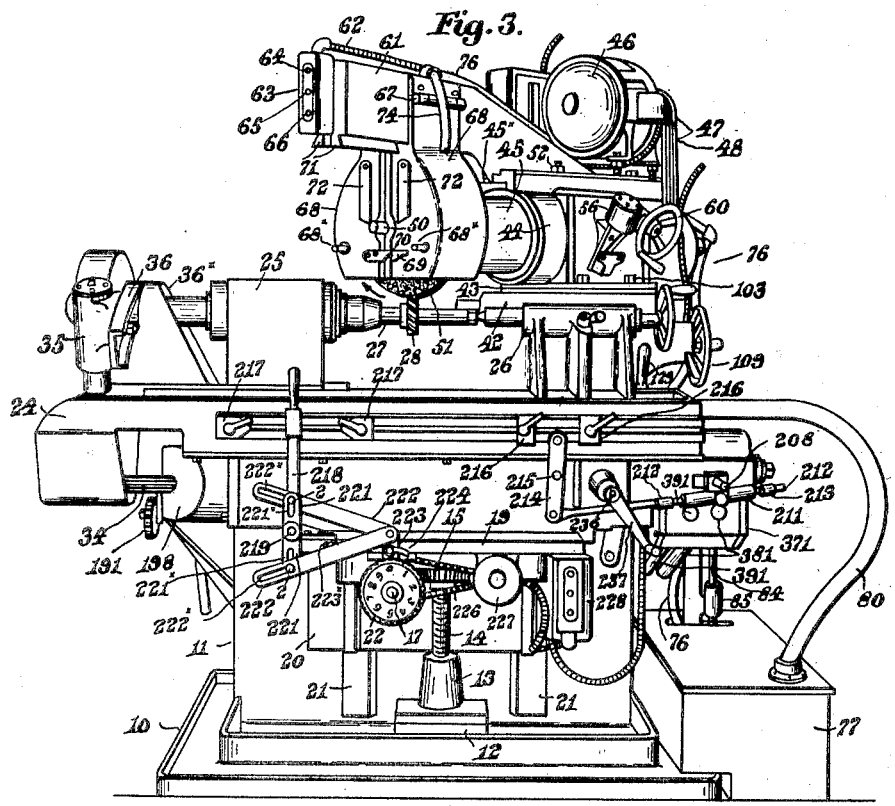
Figure 3 represents a perspective view of said machine showing the grinding wheel in position to grind spiral gears.

When grinding spur gears the shaft 50 is substantially perpendicular to the arbor 27 as indicated in Fig. 1, but when grinding angle gears this shaft 50 must be at an angle to the arbor 27, as indicated in Fig. 3.

To bring the grinding disk over the work 28, when grinding angle gears, the platform 42 is moved endwise on the column 11 and locked thereto in its adjusted position, and the turntable 43 is then moved about its center and locked to platform 42 in its adjusted position.

The tubular member 45 is then pushed forward to bring the grinding disk 51 in its proper position above the work 28 and is then locked to barrel portion 44 of turntable 43.

By means of these many adjustments any gear, either spur or helical, may be properly ground.

When the gears being ground have different diameters the table 19 may be raised and lowered to take care of the variations in size.

It will be noted that when the table 19 is raised and lowered it is not necessary to disconnect the driving mechanism actuating the feed screw 37, as the worms 38x, 39x are always retained in mesh with worm gears 38, 39 and the drive shafts 381, 391, movable about the pivot 40x may lengthen and shorten to accommodate them to various conditions.

It will also be noted that under all conditions the shaft 50 rotating the grinding disk 51 is always supported in the tubular member 45 at a point adjacent said disk so that there can be no chattering of said shaft during the grinding operation.

While the disk 51 is rotated at a constant speed by motor 46, the arbor 27 may be rotated at varying speeds according to class of work being operated upon, this variation in speed being attained by the various mechanisms all driven from the motor 46.

The feed screw 37 has secured thereto a bevel wheel 233 which meshes with a bevel gear 234 secured to a shaft 235 revoluble in a tubular member 236 extending forwardly from the front wall of housing 23.

This shaft has its forward end squared to receive an actuating handle 237 by which the shaft 236 may be rotated in either direction to cause reciprocation of the carriage 24.

This handle is used to move the carriage 24 during the adjustments of the blocks 216, 217, but when these blocks have been properly adjusted and locked in position, the handle 237 is removed from shaft 236 and the carriage is then reciprocated automatically.

In grinding spur gears the drive comes from the motor 46 to the splined shaft 50 and down the vertical shaft 93 through bevel gears 92, 91 to the splined shaft 90 which extends into the gear box 167x and drives three bevel gears 162, 163, 165 which latter gear is mounted on revoluble shaft 166 having secured to its outer end a gear 167 which transmits motion through idler gear 190 to the gear 191, secured to shaft 192 which extends into the gear box 193 said shaft 192 having on its inner end a bevel gear 194, meshing with bevel gear 195 splined to a shaft 196 movable endwise in the hub of said gear 195.

The shaft 196 drives the bevel gear 202 meshing with a bevel gear 201 on the splined shaft 34 which rotates the bevel gear 33 thereon, said gear 33 in turn rotating the gear 32 on the inclined or tilting shaft 31 having secured to its upper end the index worm 30 which meshes with the worm wheel 29 and rotates the arbor 27 supported on the work head 25.

When grinding helical or spiral gears the bevel gear 162 is disengaged from the bevel gear 163 and the drive comes from motor 46 in same manner to splined shaft 90 and then through sprocket mechanism 153, 154, 155, to clutch mechanism 152, 157 mounted on shaft 149.

When the clutch parts are engaged the shaft 149 will be rotated.

The shaft 149 extends into differential box 142 and has secured to its inner end the bevel gear 148 which drives the gear 147, the shaft 143 and shaft 145, alined therewith and having the gear 146 on one end thereof.

The gear 167 transmits rotary movement to the index mechanism in the same manner as previously described.

The change gears 173 and 170 are brought into mesh when cutting spirals to take care of the timed relation of the rotation of the work with the grinding disk 51 according to the whole number of teeth to be ground.

During the grinding of spur gears the gear 162 is placed in mesh with gear 163 fixed to the shaft 164 having the worm 168 secured thereto, this worm 168 transmitting rotary movement to the worm gear 169 and the shaft 140 which has secured to its outer end the gear 139.

The gear 139 through gears 138, 137 will rotate the shaft 136 which has on its inner end the sprocket 134 driving through chain 133, the sprocket wheel 132 fixed to the shaft 119 extending into the speed box 41 containing speed changing mechanism communicating with the devices for reciprocating the work supporting carriage 24.

By means of this mechanism in box 41 the speed of the carriage reciprocating devices may be varied as desired.

At the same time the rotary movement of gear 163 will be imparted to gear 165 on shaft 166 having on its outer end the gear 167 which through the change gear 190 and pinion 191 transmits rotary movement to the shaft 192 having the bevel gear 194 on its inner end meshing with the bevel gear 195 slidably keyed to the shaft 196.

The opposite end of this shaft 196 has secured thereto a bevel gear 202 meshing with the bevel gear 201, through which slides the splined shaft 34.

This splined shaft 34 has fixed to one end thereof the gear 33 meshing with the bevel gear 32 secured to the lower end of shaft 31 which has secured to its upper end the worm 30 for actuating the worm gear 29 on the arbor 27 carrying the gear 28 to be ground.

It is obvious, therefore, that the rotation of the gear 162 will be transmitted through speed changing mechanism to reciprocate the work-supporting carriage and will simultaneously through other speed changing devices rotate the work being operated.

On the same shaft as sprocket wheel 132 is change gear 185 driving the gears 186, 185 and 189, and then back through the differential in box 142 to worm 182 and gear 176 which increases or decreases the rotation of change gear 146.

By thus adding or subtracting from the whole number of teeth indexed by drive gear 146, change gear 173 and pinion 170, the spiral angle of the teeth of the gears being ground will be taken care of.

The change gears 139, 138, 137 effect through the sprocket chain 133 both the feed mechanism and the change gears 185, 188, 189, which change gears take care of the angle on the gear teeth, and so by means of the change gears 139, 138, 137, it is possible to alter the feed and angle gears 185, 189 and 188 in any proportions desired.

The differential in box 142 makes it possible to change the feed of grinding without going through the usual figures that are necessary in the ordinary method of grinding helical gears.

Any attempt to grind spiral or helical gears without a differential would make it necessary to calculate the required ratio of the index gears and feed gears and this calculation must be made to a great many decimals as otherwise a great error would result, thus impairing the accuracy of the gears being ground.

It frequently happens that the required ratio consists of prime numbers especially in grinding right and left hand gears with one wheel.

To produce correct helically ground gears with their axes parallel to each other, the angle for the right and left hand spirals must be absolutely the same, otherwise, there will not be a bearing on the whole length of the teeth.

This figuring takes time and is seldom sufficiently accurate as to get all gears in a train to have the same angle.

By the mechanism herein shown and described, it is possible to get all gears in a train with exactly the same angle regardless of the number of teeth and this is a great advantage.

The slots 221x in the arms 221 are provided so that the pivots 2 may be moved toward and from the axis of shaft 219 to vary the movement of the pawl 224 as desired.

This pawl 224 is mounted upon the arm 223 so that it will be held either in frictional engagement with the ratchet 22 or disengaged therefrom as shown in Figs. 1 and 3.

The slots 222x in the links 222 are provided so that when one pivot 2 is pushing one link 222 forward the other pivot 2 may travel along the slot 222x in the other link 222 without effecting any movement thereof.

As soon as one link 222 has reached the limit of its forward movement, the spring 223x will move the arm 223 to the left of Fig. 1 about the shaft 17 causing the links 222 to assume the position shown in Fig. 1 preparatory to a forward movement of the other link 222.

It is self-evident, therefore, that when the pawl 224 is in engagement with the ratchet 22, the forward movement of either link 222 will impart a slight upward movement to the table 19 and the work supporting arbor 27.

The grinding wheel 51 has such a width that there are more winds of the thread thereof than could at any one time possibly coact with the teeth of the gear 28 being ground.

This makes it possible to adjust the grinding wheel 51 so that the outer winds of thread will coact with the gear 28 during the grinding operation and when after considerable use these winds become worn, said grinding wheel may be moved outwardly a slight degree to bring fresh surfaces of the thread into coacting relation with the teeth of gear 28.

By this adjustment better and more uniform work will result and the grinding wheel may be used much longer than it could be used otherwise.

While throughout the specification reference is made to the grinding and trueing of both spur and angle gears by the machine, it is equally true that the machine may be used for grinding splined shafts, sprocket wheels and many other articles of similar character.

It is believed that the operation and many advantages of the invention will be understood readily without further description.

Having thus described my invention, I claim:

1. In a gear grinding machine; a horizontally disposed slidable platform; a turntable thereon provided with a superimposed barrel portion having a bore of relatively large diameter; a non-revoluble tubular member slidable endwise in said bore; a rotatable shaft within said tubular member; a threaded grinding disk on one end of said shaft; means for rotating said shaft; a horizontally disposed slidable carriage; a work supporting arbor on said carriage beneath the grinding disk; means for rotating said disk and arbor in timed relation at all times; a rack extending lengthwise of said tubular member; a pinion engaging said rack; and means mounted on said turntable for rotating said gear and thereby moving said tubular member endwise.

2. In a gear grinding machine; a slidable platform; a turntable thereon provided with a superimposed barrel portion having a bore of relatively large diameter; a non-revoluble tubular member within and slidable endwise of said bore; a rotatable shaft within said tubular member; a threaded grinding disk on one end of said shaft; means for rotating said shaft; a horizontally disposed slidable carriage; a work supporting arbor on said carriage beneath the grinding disk; means for rotating said disk and arbor in timed relation; a rack extending lengthwise of said tubular member; a pinion engaging said rack; a shaft therefor rotatable in bearings on said turntable; a worm gear on said shaft; a worm meshing with said worm gear; and an actuating wheel for rotating said worm.

3. In a gear grinding machine; a slidable platform; a turntable thereon provided with a superimposed barrel portion having a bore of relatively large diameter; a non-revoluble tubular member within and slidable endwise of said bore; means for adjusting said tubular member within said barrel portion, a rotatable shaft within said tubular member; a threaded grinding disk on one end of said shaft; means for rotating said shaft; a horizontally disposed slidable carriage; a work supporting arbor on said carriage beneath the grinding disk; and means for rotating said disk and arbor in timed relation and said arbor at different speeds.

4. In a gear grinding machine; a slidable platform; a turntable thereon provided with a superimposed barrel portion having a bore of relatively large diameter; a non-revoluble tubular member within and slidable endwise of said bore; means for adjusting said tubular member within said barrel portion; a rotatable shaft within said tubular member; a threaded grinding disk on one end of said shaft; means for rotating said shaft; a horizontally disposed slidable carriage; a work supporting arbor on said carriage beneath the grinding disk; means for rotating said disk and arbor in timed relation; and means operable by the shaft rotating means for adjusting said arbor vertically toward and from the grinding disk.

5. In a gear grinding machine; a slidable platform; a turntable thereon provided with a superimposed barrel portion having a bore of relatively large diameter; a non-revoluble tubular member, within and slidable endwise of said bore, a rotatable shaft within said tubular member; a threaded grinding disk on one end of said shaft; means for rotating said shaft; a horizontally disposed slidable carriage; a work supporting arbor on said carriage beneath the grinding disk; means for rotating said disk and arbor in timed relation; and means operable by the shaft rotating means for raising said carriage and arbor during the grinding operation.

6. In a gear grinding machine; a slidable platform; a turntable thereon provided with a superimposed barrel portion having a bore of relatively large diameter; a non-revoluble tubular member within and slidable endwise of said bore; a rotatable shaft within said tubular member; a threaded grinding disk on one end of said shaft; means for rotating said shaft; a work supporting arbor beneath the grinding disk; means for rotating said disk and arbor in timed relation; and means operable by the shaft rotating means for moving said arbor endwise beneath the grinding disk during the grinding operation.

7. In a gear grinding machine; a slidable platform; a turntable thereon provided with a superimposed barrel portion having a bore of relatively large diameter; a non-revoluble tubular member within and slidable endwise of said bore; a rotatable shaft within said tubular member; a threaded grinding disk on one end of said shaft; means for rotating said shaft; a slidable carriage; a work supporting arbor on said carriage beneath the grinding disk; and means actuated by said shaft rotating means for rotating said arbor at different speeds.

8. In a gear grinding machine; a support provided with a superimposed barrel portion having a bore of relatively large diameter; a non-revoluble tubular member within said bore and slidable endwise therein; a rotatable shaft within said tubular member; a threaded grinding disk on one end of said shaft; means for rotating said shaft; a rack extending lengthwise of said tubular member; a pinion engaging said rack; and means mounted on said support for rotating said pinion and thereby moving said tubular member endwise.

9. In a gear grinding machine; a support provided with a superimposed barrel portion having a bore of relatively large diameter; a non-revoluble tubular member within said bore and slidable endwise therein; a rotatable shaft within said tubular member; a threaded grinding disk on one end of said shaft; a rack extending lengthwise of said tubular member; a pinion engaging said rack; a shaft therefor rotatable in bearings on said support; a worm gear on said shaft; a worm meshing with said worm gear; and an actuating wheel for rotating said worm.

10. In a gear grinding machine; a support provided with a superimposed barrel portion having a bore of relatively large diameter; a tubular member within said bore and slidable endwise therein; a rotatable shaft within said tubular member; a threaded grinding disk on one end of said shaft; means for rotating said shaft; a slidable carriage; a work supporting arbor on said carriage beneath the grinding disk; means for rotating said disk and arbor in timed relation; means operable by the shaft rotating means for raising said carriage during the grinding operation; and index mechanism for determining the exact amount of said adjustment.

11. In a gear grinding machine; a support provided with a superimposed barrel portion having a bore of relatively large diameter; a tubular member within said bore and slidable endwise therein; a rotatable shaft within said tubular member; a threaded grinding disk on one end of said shaft; means for rotating said shaft; a work supporting arbor beneath the grinding disk; means for rotating said disk and arbor in timed relation; and means operable by the shaft rotating means for moving said arbor endwise during the grinding operation and simultaneously moving the arbor vertically towards said grinding disk.

12. In a gear grinding machine; a rotatable shaft; a threaded grinding disk on one end of said shaft; means for rotating said shaft; a slidable carriage; a work supporting arbor on said carriage disposed horizontally beneath the grinding disk; means for rotating said disk and arbor in timed relation; a lifting screw adapted to move said arbor vertically toward the grinding disk while horizontally disposed; means for reciprocating said carriage; mechanism for rotating said screw; and means on said carriage for actuating said screw rotating mechanism during the movement of said carriage in either direction.

13. In a gear grinding machine; a rotatable shaft; a threaded grinding disk on one end of said shaft; means for rotating said shaft; a slidable carriage; a work supporting arbor on said carriage beneath the grinding disk; means for rotating said disk and arbor in timed relation; a lifting screw adapted to move said arbor towards the grinding disk; means for reciprocating said carriage; a worm gear on said screw; a worm meshing therewith; a ratchet on the worm shaft; a pawl coacting with said ratchet; an arm supporting said pawl; and means on said carriage for imparting a forward movement to said arm during the movement of said carriage in either direction.

14. In a gear grinding machine; a rotatable shaft; a threaded grinding disk on one end of said shaft; means for rotating said shaft; a work supporting arbor beneath the grinding disk; means for rotating said disk and arbor in timed relation; a lifting screw adapted to move said arbor towards the grinding disk; means for reciprocating said carriage; a worm gear on said lifting screw; a worm meshing with said gears; a ratchet fixed to the worm shaft; an arm movable about the worm shaft; a pawl pivoted to said arm; a pivoted lever; links pivoted at one end to the free end of said arm and at the opposite end to said lever on opposite sides of its pivot; and adjustable blocks on said carriage adapted in the reciprocation of said carriage to contact with said lever and move it about its pivot.

15. In a gear grinding machine; a rotatable shaft; a threaded grinding disk on one end of said shaft; means for rotating said shaft; a work supporting arbor beneath the grinding disk; means for rotating said disk and arbor in timed relation; a lifting screw adapted to move said arbor towards the grinding disk; means for reciprocating said carriage; a worm gear on said lifting screw; a worm meshing with said gear; a ratchet fixed to the worm shaft; an arm movable about the worm shaft; a pawl pivoted to said arm; a pivoted lever; links pivoted at one end to the free end of said arm and at the opposite end to said lever on opposite sides of its pivot; adjustable blocks on said carriage adapted in the reciprocation of said carriage to contact with said lever and move it about its pivot; and motor actuated mechanism for rotating said worm in the opposite direction to lower the arbor quickly.

16. In a gear grinding machine; a slidable horizontally disposed carriage; a feed screw for reciprocating said carriage; a nut on said carriage through which said screw extends, worm gears freely rotatable about the axis of said screw each provided with clutch teeth; a clutch member keyed to and slidable lengthwise of said feed screw between said worm gears; means for engaging said clutch member with either worm gear; worms meshing with said worm gears; shafts for said worms rotatable in opposite directions; and means for rotating said worm shafts, said rotating means having provision for varying the speed of said shafts.

17. In a gear grinding machine, a slidable carriage; a feed screw for reciprocating said carriage; worm gears freely rotatable about the axis thereof each provided with clutch teeth; a clutch member keyed to and slidable lengthwise of said feed screw; means for engaging said clutch member with either worm gear; worms meshing with said worm gears; shafts for said worms rotatable in opposite directions; means for rotating said worm shafts; and a swinging cradle movable about the axis of said feed screw and supporting said worms.

18. In a gear grinding machine; a slidable carriage; a feed screw for reciprocating said carriage; worm gears freely rotatable about the axis thereof, each provided with clutch teeth; a clutch member keyed to and slidable lengthwise of said feed screw; means for engaging said clutch member with either worm gear; a swinging support for said worms; telescopic shafts for rotating said worms; a pivoted housing for the lower ends of said shafts; intermeshing gears therein causing rotation of said shafts in opposite directions; and mechanism communicating with one of said shafts adapted to be adjusted to rotate said shaft at different speeds.

19. In a gear grinding machine; a head stock; an arbor revoluble therein; a worm gear thereon; a worm meshing with said gear; a housing for said worm; a fixed segment; means for securing said housing in adjusted position on said segment; and means on the lower end of the shaft of said worm for imparting rotary movement to said worm.

20. In a gear grinding machine; a head stock; an arbor revoluble therein; a worm gear thereon; a worm meshing with said gear; a housing for said worm; a fixed segment; means for securing said housing in adjusted position on said segment; and means on the lower end of the shaft of said worm for imparting rotary movement to said worm at varying speeds.

21. In a gear grinding machine; a slidable carriage; a feed screw for reciprocating said carriage; worm gears freely rotatable about the axis thereof each provided with clutch teeth; a clutch member keyed to and slidable lengthwise of said feed screw; means for engaging said clutch member with either worm gear; worms meshing with said worm gears; shafts for said worms rotatable in opposite directions; and means for rotating said worm shafts.

22. In a gear grinding machine; a slidable carriage; a feed screw for reciprocating said carriage; worm gears freely rotatable about the axis thereof each provided with clutch teeth; a clutch member keyed to and slidable lengthwise of said feed screw; means for engaging said clutch member with either worm gear; worms meshing with said worm gears; telescopic shafts for said worms rotatable in opposite directions; and means for rotating said worm shafts.

23. In a gear grinding machine, a slidable carriage; a feed screw therefor; worm gears revoluble on said screw and provided with clutch teeth; a clutch member keyed to and slidable on said feed screw to engage either worm gear; worms rotatable in opposite directions in mesh with said worm gears; a pivoted lever for moving said clutch member endwise of said feed screw into engagement with either worm gear; a sleeve suspended from the outer end of said lever; a rod extending through said sleeve; collars thereon opposite the ends of said sleeve; a pivoted member the lower end of which is connected to an end of said rod; and blocks on said carriage adapted to engage the upper end of said pivoted member during its movement in either direction and through intervening mechanism shift said clutch member to change the direction of movement of said carriage.

24. In a gear grinding machine, a slidable carriage; a feed screw therefor; worm gears revoluble on said screw and provided with clutch teeth; a clutch member keyed to and slidable on said feed screw to engage either worm gear; worms rotatable in opposite directions in mesh with said worm gears; a pivoted lever for moving said clutch member endwise of said feed screw into engagement with either worm gear; a sleeve suspended from the outer end of said lever with inwardly extending shoulders at its opposite ends; a rod extending through said sleeve; collars thereon opposite the ends of said sleeve; a pivoted member the lower end of which is connected to an end of said rod; a collar on said rod within and midway of said sleeve; springs within said sleeve between said shoulders and the inner collar on said rod; and blocks on said carriage adapted to engage the upper end of said pivoted member during its movement in either direction and shift through intervening mechanisms said clutch member to change the direction of movement of said carriage.

25. In a gear grinding machine, a slidable carriage; a feed screw therefor; worm gears revoluble on said screw and provided with clutch teeth; a clutch member keyed to and slidable on said feed screw to engage either worm gear; worms rotatable in opposite directions in mesh with said worm gears; a pivoted lever for moving said clutch member endwise of said feed screw into engagement with either worm gear; a sleeve suspended from the outer end of said lever with inwardly extending shoulders at its opposite ends; a rod extending through said sleeve; collars thereon opposite the ends of said sleeve; a pivoted member the lower end of which is connected to an end of said rod; a collar on said rod within and midway of said sleeve; springs within said sleeve between said shoulders and the inner collar on said rod; blocks on said carriage adapted to engage the upper end of said pivoted member during its movement in either direction and shift through intervening mechanisms said clutch member to change the direction of movement of said carriage; and supplementary mechanism for manually rotating said feed screw.

26. In a gear grinding machine, a slidable carriage; a feed screw therefor; worm gears revoluble on said screw and provided with clutch teeth; a clutch keyed to and slidable on said feed screw to engage either worm gear; worms rotatable in opposite directions in mesh with said worm gears; a pivoted lever for moving said clutch member endwise of said feed screw; shafts for said worms; intermeshing gears on said shafts; means for rotating one of said shafts; a motor; and speed changing mechanism interposed between said motor and shaft rotating means whereby the speed of reciprocation of said carriage may be varied as desired.

27. In a gear grinding machine, a slidable carriage; a feed screw therefor; worm gears revoluble on said screw and provided with clutch teeth; a clutch keyed to and slidable on said feed screw to engage either worm gear; worms rotatable in opposite directions in mesh with said worm gears; a pivoted lever for moving said clutch member endwise of said feed screw; shafts for said worms; intermeshing gears on said shafts; means for rotating one of said shafts; a motor; speed changing mechanism interposed between said motor and shaft rotating means whereby the speed of reciprocation of said carriage may be varied as desired; a work supporting arbor on said carriage; means for rotating said arbor; and speed changing mechanism interposed between said motor and arbor rotating means whereby the speed of rotation of said arbor may be varied as desired.

28. In a gear grinding machine; a reciprocating carriage; a work supporting arbor thereon; means for rotating said arbor; a differential gearing; a rotatable splined shaft; a motor; means for rotating said shaft adapted to be actuated by said motor; means adapted to be connected to one end of said shaft to transmit rotary motion to said differential gearing; driving means interposed between said differential gearing and said arbor rotating means; and other driving mechanism adapted to be connected to the opposite end of said splined shaft for actuating said arbor rotating means.

29. In a gear grinding machine; a reciprocating carriage; a work supporting arbor thereon; means for rotating said arbor; a differential gearing; a rotatable splined shaft; a motor; means for rotating said shaft adapted to be actuated by said motor; means adapted to be connected to one end of said shaft to transmit rotary motion to said differential gearing; driving means interposed between said differential gearing and said arbor rotating means; and other driving mechanism adapted to be connected to the opposite end of said splined shaft for actuating said arbor rotating means including a pair of gears adapted to be moved into and out of mesh.

30. In a gear grinding machine; a reciprocating carriage; a work supporting arbor thereon; means for rotating said arbor; a differential gearing; a rotatable splined shaft; a motor; means for rotating said shaft adapted to be actuated by said motor; means adapted to be connected to one end of said shaft to transmit rotary motion to said differential gearing and including a manually actuated clutch; driving means interposed between said differential gearing and said arbor rotating means; and other driving mechanism adapted to be connected to the opposite end of said splined shaft for actuating said arbor rotating means.

31. In a gear grinding machine; a reciprocating carriage; a work supporting arbor thereon; means for rotating said arbor; a differential gearing; a rotatable splined shaft; a motor; means for rotating said shaft adapted to be actuated by said motor; means adapted to be connected to one end of said shaft to transmit a rotary motion to said differential gearing and including a manually actuated clutch; driving means interposed between said differential gearing and said arbor rotating means; and other driving mechanism adapted to be connected to the opposite end of said splined shaft for actuating said arbor rotating means and including a pair of gears adapted to be moved into and out of mesh.

32. In a gear grinding machine; a slidable carriage; a feed screw therefor; worm gears revoluble on said screw and provided with clutch teeth; a clutch keyed to and slidable on said feed screw to engage either worm gear; worms rotatable in opposite directions in mesh with said worm gears; a pivoted lever for moving said clutch member endwise of said feed screw; a sleeve suspended from the outer end of said lever; a rod extending through said sleeve; collars thereon opposite the ends of said sleeve; a pivoted arm the lower end of which is connected to an end of said rod; and blocks on said carriage adapted to engage the upper end of said arm during its movement in either direction and shift said clutch member.

33. In a gear grinding machine; a slidable carriage; a work supporting arbor thereon; means for rotating said arbor; means for reciprocating said carriage; driving mechanism; a speed changing mechanism interposed between said driving mechanism and carriage reciprocating means including two parallel shafts having thereon a plurality of pairs of gears of different diameters; and means for placing either pair of gears in mesh whereby said carriage may be reciprocated at different speeds.

34. In a gear grinding machine; a slidable carriage; a work supporting arbor thereon; means for rotating said arbor; means for reciprocating said carriage; driving mechanism; a box containing a speed changing mechanism interposed between said driving mechanism and carriage reciprocating means including two parallel shafts having thereon a plurality of pair of gears of different diameters, one set of which are on a grooved slidable sleeve; a slidable plate on said box; a forked member movable therewith and engaging the groove of said collar; an oscillating shaft; an arm on the rear end of said oscillating shaft; a link between said arm and plate; an actuating lever on the opposite end of said oscillating shaft; and a segment with which said lever coacts adapted to designate the relative positions of the gears in said box.

35. In a gear grinding machine; a work supporting table; a lifting screw therefor; a fixed nut therefor; a worm gear secured to said screw; a worm meshing therewith; a sprocket wheel on the worm shaft; a motor; a sprocket wheel on the motor shaft; a sprocket chain on said sprocket wheels for transmitting motion from the motor to the worm; and an electric switch for rotating said motor in either direction to raise or lower the work supporting table.

Signed by me at Wollaston, Massachusetts this 1 day of April, 1929.

FRANK BURGESS.